United States Patent [19]
Gallagher et al.

[11] 3,782,685
[45] Jan. 1, 1974

[54] BELLOWS SEALED BUTTERFLY VALVE

[75] Inventors: Bernard J. Gallagher; Earl D. Shufflebarger, both of Mentor; David M. Simko, Parma Heights; Richard J. Medvick, Brooklyn Heights; John R. Boylan, Cleveland Heights; Oliver L. Danko, Chesterland, all of Ohio

[73] Assignee: Nupro Company, Cleveland, Ohio

[22] Filed: July 17, 1972

[21] Appl. No.: 272,561

[52] U.S. Cl............... 251/306, 251/335 B, 74/18.1
[51] Int. Cl............................................ F16k 1/22
[58] Field of Search.......................... 251/306, 335; 74/17.8, 18, 18.1

[56] References Cited
UNITED STATES PATENTS

| | | | |
|---|---|---|---|
| 1,441,794 | 1/1923 | Germain | 74/18.1 UX |
| 1,514,968 | 11/1924 | Hull | 251/335 B X |
| 2,607,233 | 8/1952 | Bosch | 74/18.1 |
| 3,051,008 | 8/1962 | Hamren | 74/18.1 |
| 3,111,300 | 11/1963 | Boone | 251/306 |
| 3,241,467 | 3/1966 | Young | 74/18.1 X |
| 3,491,789 | 1/1970 | Callahan et al. | 251/335 R X |

*Primary Examiner*—Henry T. Klinksiek
*Attorney*—Albert P. Sharpe, III

[57] ABSTRACT

The specification and drawings disclose a valve particularly suited for use in critical vacuum systems. The valve shown comprises a body having a through flow passage of generally circular cross-section. A butterfly valve disc is positioned in the passage and has an outer periphery adapted to close the passage when rotated to a position transverse to the axis of the passage. A rotatable operating stem is connected to the valve disc and extends outwardly through the body. Joined with the operating stem is an actuating stem which has an outer end portion inclined at an angle relative to the axis of the operating stem. A bellows assembly encloses the actuating stem with a lower portion of the assembly joined to the body. The bellows assembly includes a flexible, gas impervious bellows member which encloses the actuating stem and is inclined throughout a portion of its length at an angle corresponding to the angle of the inclination of the outer end portion of the actuating stem. Additionally, the outer end of the bellows is rotatably engaged with the outer end of the actuating stem. Means are provided in the form of a rotatable housing member for applying a generally radially acting force to the outer end of the bellows assembly to produce rotation of the operating stem and deflection of the bellows without torsional loading of the bellows.

10 Claims, 5 Drawing Figures

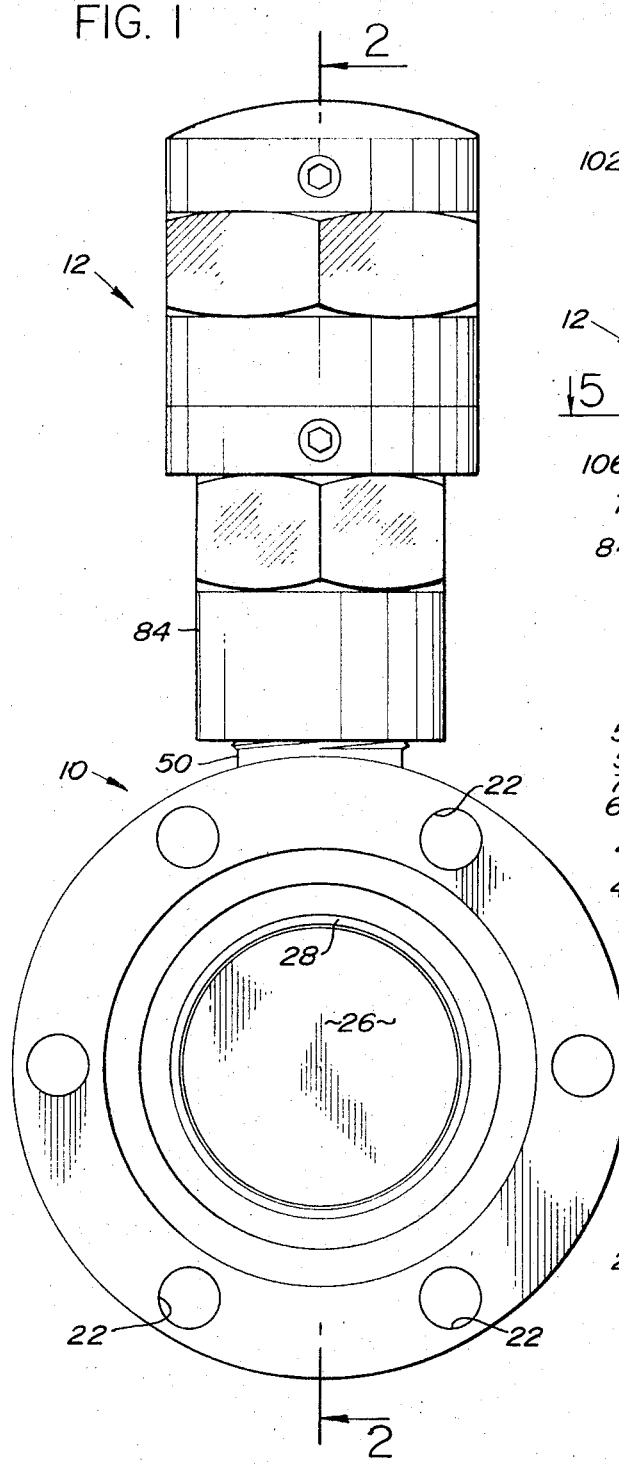
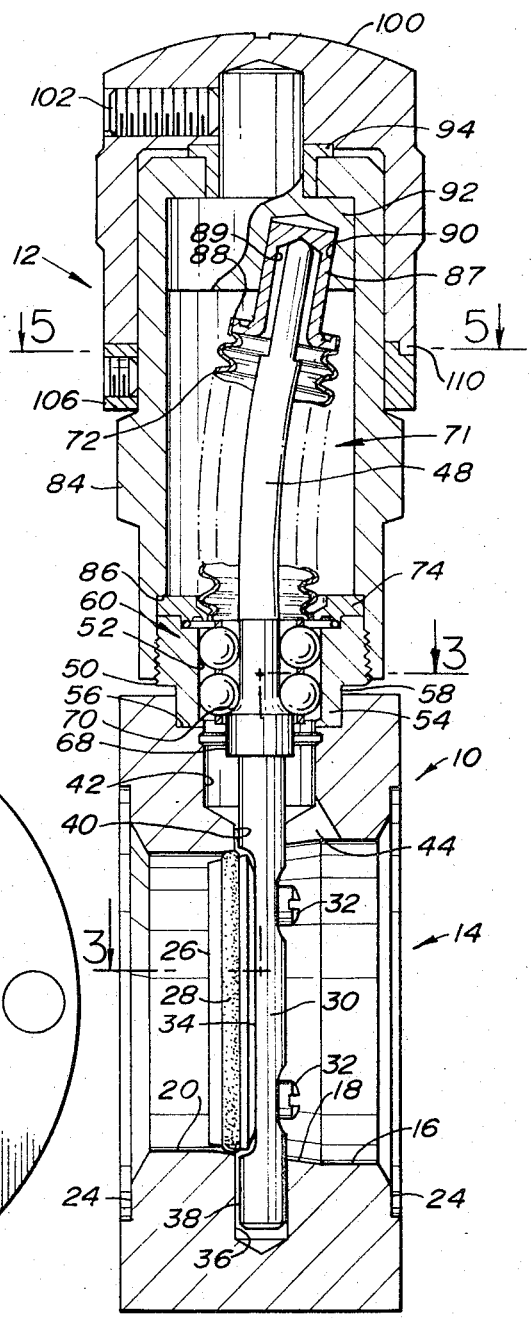

PATENTED JAN 1 1974 3,782,685

BELLOWS SEALED BUTTERFLY VALVE

The subject invention is directed toward the valve art and, more particularly, to an improved butterfly valve.

The invention is especially suited for use as a high vacuum valve and will be described with particular reference thereto; however, as will become apparent, the invention could be used for many different types of service.

Generally, in systems where it is desired to achieve vacuums below $10^{-6}$ Torr, it is not practical to use valves having rubber or the like seals between the system and the atmosphere. The reason for this is that there is a permeability problem which results in the migration of molecules of unknown impurities through the rubber seals and subsequent introduction of them into the vacuum system. As a consequence, the use of statically sealed valves is preferred. Statically sealed valves are, of course, already known in connection with high vacuum service. Customarily, the statically sealed valves are of the reciprocal stem type sealed with a bellows or diaphragm. Although reciprocal valves are generally satisfactory, they do have certain disadvantages in that they are not particularly quick acting and they have low conductance.

Butterfly valves are theoretically ideal for vacuum systems because they are quick acting, have high conductance, and are generally more compact and more simply constructed than reciprocal valves. The main difficulty with using butterfly valves in vacuum systems has been that none are available which are statically sealed. The primary reason for this is that bellows and diaphragms which can be used in statically sealed systems are not usable in torsion. That is, it is not generally possible to satisfactorily transmit a rotating force through a bellows or diaphragm as is required to shift a butterfly valve. As a consequence, butterfly valves generally require the use of rubber or plastic stem seals which suffer from the disadvantage of molecular migration into the vacuum system.

The subject invention overcomes the above problems and provides a butterfly valve which is statically sealed and does not require any type of rotary seal, resilient gaskets or the like. All joints in the operating assembly can be metal-to-metal seals, bonded or welded, if desired. Further, the assembly is arranged so that when used in a vacuum system, there is little chance of, virtual leaks because the operating portion of the assembly is designed for easy pump-down.

Specifically, and in accordance with the invention, the valve provided contemplates a body having a through flow passage of generally circular cross-section. A valve disc member is positioned in the passage and has an outer periphery adapted to close the passage when rotated to a position transverse to the axis of the passage. A rotatable operating stem is connected to the valve disc and extends outwardly through the body. Formed integrally with the operating stem or positively connected thereto is an actuating stem which has an outer end portion inclined at an angle relative to the axis of the operating stem. A bellows assembly encloses the actuating stem with a lower portion of the assembly joined to the body such as by being clamped or welded thereto. The bellows assembly includes a flexible, gas impervious bellows member which encloses the actuating stem and is inclined throughout a portion of its length at an angle corresponding to the angle of the inclination of the outer end portion of the actuating stem. Additionally, the outer end of the bellows is rotatably engaged with the outer end of the actuating stem. Means are provided in the form of a rotatable housing member for applying a force generally radially acting to the outer end of the bellows assembly and generally tangentially acting to the effective moment arm created by the actuating stem so that rotation of the operating stem is produced without torsional loading of the bellows. Because of this arrangement, there are no rotating seals between the actuating assembly and the body of the valve. Moreover, the entire inner portion or interior of the bellows assembly can be open to the flow passageway through the valve body so as to facilitate pump-down when the valve is used in a critical vacuum system.

Another aspect of the invention contemplates that the valve disc and operating stems are somewhat freely floating in the body so that the disc has a self-centering action. Preferably, the actuating and operating stems are guided by bearing means located at least two spaced points but arranged so as to permit some axial movement of the stems.

Accordingly, a primary object of the invention is the provision of a bellows sealed butterfly valve in which there are no rotary or reciprocal stem seals.

Yet another object is the provision of a butterfly valve particularly suited for critical vacuum systems and arranged so that virtual leaks are minimal, pump down is efficient, and all seals between the vacuum system and atmosphere can be metal-to-metal or bonded.

A still further object of the invention is the provision of a valve of the general type described which is relatively simple to manufacture and highly reliable in operation.

The above and other objects and advantages will become apparent from the following description when read in conjunction with the accompanying drawings wherein:

FIG. 1 is an elevational view showing a preferred embodiment of a valve formed in accordance with the invention;

FIG. 2 is an enlarged cross-sectional view taken on line 2—2 of FIG. 1 and showing the valve in a closed position;

Figure 3:
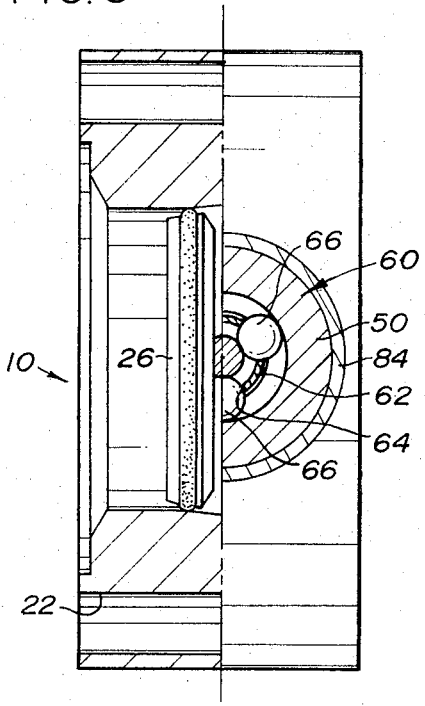
FIG. 3 is a cross-sectional view taken on line 3—3 of FIG. 2.

Referring more particularly to FIGS. 1 and 2 of the drawings, the valve is shown as including a body 10 and an actuating assembly 12 which is connected to the body and extends outwardly therefrom. In the subject embodiment, the body 10 is formed as one piece of cylindrical cross-section and provided with an axially extending through passage 14. Passage 14 includes a first cylindrical section 16, a tapered, seat defining section 18 and a cylindrical section 20. It will be noted that a spaced series of bolt holes 22 are provided for connecting the body to standard vacuum flanges. Further, gasket recesses 24 are formed about the outer ends of the passageway to receive a standard soft metal gasket of the type typically used in high vacuum systems. Although not shown, the recesses 24 are normally provided with some type of gasket engaging protuberances. It should be appreciated that other types of connecting arrangements could equally well be provided, depending upon system requirements, etc.

Positioned within the through passage 14 is a circular valve disc 26 formed from any suitable material and having a peripherally extending seal 28 carried thereon. The seal can be formed from many materials depending upon the system requirements; however, some of the new fluorocarbon compounds are particularly satisfactory. The disc itself is, in the preferred embodiment, formed from stainless steel and is connected to an operating stem 30 by a pair of screws 32. Screws 32 extend through openings formed in the stem 30 into tapped openings in the disc 26. The screws 32 are preferably slotted throughout their length to provide an air passage along the threads to facilitate pump-down and help prevent virtual leaks in the valve. (A virtual leak results from gas being trapped in a small cavity or the like and slowly leaking therefrom during use of the valve in a high vacuum environment.)

As shown, the stem 30 is preferably provided with a flat 34 which engages the face of the valve disc and holds it positioned.

The lower end of stem 30 is relatively loosely received within a bore 36 formed in the valve body. It should be noted that the length of the lower end portion of stem 30 is less than the total depth of the bore 36. This permits some vertical freedom so that the disc and stem assembly can be somewhat self-centering. Further, a flat 38 is formed longitudinally along the lower end of the stem to provide an air passage.

The upper end of the operating stem 30 passes through an opening 40 which connects with an enlarged counterbore 42. Adjacent the opening 40, a slot 44 is formed through the body so as to provide free communication with the counterbore 42.

The upper end of stem 30 is directly connected with the actuating stem, 48. In the embodiment under consideration, the operating stem 30 and the actuating stem 48 are formed integrally from a single piece of stock; however, these can obviously be formed as separate elements and positively interconnected, if desired. The details and arrangement of the operating stem 48 will subsequently be described.

A bonnet member 50 with a centerbore 52 of a diameter substantially equal to the diameter of the counterbore 42 is joined to the valve body. In the subject embodiment, the bonnet member 50 has an axially extending sleeve portion 54 which mates with a recess 56 formed about the outer end of counterbore 42. Preferably, the sleeve is welded to the body about the joint 58 as shown in FIG. 2.

The operating stem 30 and the actuating stem 48 are guided in the bonnet member 50 by a bearing means 60. Many different types of bearings could be used, for example, simple sleeve bearings or the like; however, in the subject embodiment, a ball bearing assembly is shown. In particular, as seen in FIG. 3, bearing means 60 comprises a cylindrical sleeve 62 having a plurality of openings 64 formed therethrough. Balls 66 are received in the openings and are sized so as to engage the inner wall of the bore 52 and the outer surface of the actuating stem 48. As best shown in FIG. 2, at the juncture between the actuating stem 48 and the operating stem 30, there is a radially extending flange 68 having a fillet 70. The lower balls in the assembly rest on the flange 68 for support in the bore 52. This particular bearing assembly is excellently suited for the specific application. It creates few, if any, virtual leaks, it leaves wide-open paths for pump-down, and it properly supports the stems so they can transform a linear force into rotaty motion with little wear or frictional loss without the use of lubricants which would be undesirable in a high-vacuum system.

Of particular importance to the invention is the arrangement of the actuating assembly 12 whereby the operating and actuating stems can be given a rotary motion without the need for a rotary seal. Referring in particular to FIG. 2, it will be seen that the actuating stem 48 has its outer end portion bent at an incline relative to the axis of rotation of stem 30. In the subject embodiment, the incline is shown as in the range of approximately 10° to 20°; however, this could obviously vary.

Figure 4:
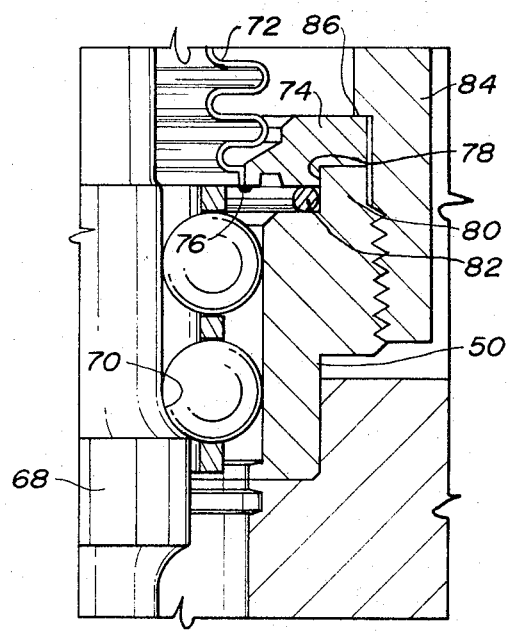
FIG. 4 is an enlarged view of bearing means 60 of FIG. 2.

Enclosing the actuating stem 48 is a bellows assembly 71 which includes a gas impervious, flexible metal bellows member 72. The bellows member 72 has an open lower end which is connected to the bonnet member 50. The connection between the lower end of the bellows member 72 and the bonnet member 50 is best shown in FIG. 4. It will be noted that a relatively rigid annular flange member 74 is joined about the lower edge of bellows 72 and extends radially outwardly therefrom. Preferably, the flange member 74 is fusion bonded to the bellows as shown at 76. The member 74 extends outwardly over a small recess 78 formed about the top surface of the bonnet member 50. It will be seen that a small, upwardly extending flange 80 is positioned about the top of bonnet member 50 and acts as a positioning flange or shoulder for a metal O-ring 82 and for flange member 74. Metal O-ring 82 serves as a seal between the bonnet member 50 and the flange 74. Referring again to FIG. 2, it will be seen that a clamp or bonnet nut member 84 is threadedly connected to the bonnet member 50 and has an inwardly extending shoulder 86 which, as shown in FIG. 4, engages the top surface of the flange 74. By tightening the bonnet nut 84, substantial sealing pressure is applied to form a tight metal-to-metal seal between the metal O-ring, the top of the bonnet member 50 and the under surface of flange 74. In certain instances, the metal O-ring could be eliminated and a tight metal-to-metal seal made between the flange 74 and the top of the bonnet member 50. Flange member 74 also could be fusion bonded to bonnet member 50.

As previously mentioned, the upper end portion of bellows member 72 is inclined at an angle corresponding to the angle of inclination of the outer end of actuating stem 48. As shown, the end of bellows 72 is closed by a generally cup-shaped cap member 87 which has a laterally extending flange 88 welded or otherwise positively and sealingly joined to the upper edge of bellows 72. The outer free end of the actuating stem 48 is rotatably received and guided within the rigid cap member 87. A bore 89 is formed inwardly of cap member 87 and receives the free end of actuating stem 48.

The cap member 87 is rotatably received in a bore 90 which is formed at a corresponding angle in a member 92. Member 92 is rotatably received in the upper end of member 84. As shown, a reduced diameter end portion of member 92 extends outwardly through a sleeve bearing 94 carried in member 84.

With the arrangement thus far described, rotation of member 92 applies a lateral force to the cap member 87 and will produce rotation of the stem and consequent rotation of the valve disc 26. Because of the rotating connection between the actuating stem 48 and the cap member 87, the rotation of the stem takes place with only lateral deflection of the bellows. That is, the bellows does not rotate or undergo any torsional loading. Thus, all connections between the bellows and the valve body can be positive, nonrotating connections. Consequently, the valve is particularly suited for critical vacuum uses where rotary seals are not satisfactory.

Although the assembly thus far described could be used without additional structure, it is preferable to provide a cup shaped handle member 100 that is connected to the reduced diameter portion of member 92. As shown, handle member 100 is releasably connected by a set screw 102. Although the embodiment shown is intended for manual operation, it could obviously be used with various types of power actuators, air, electric or the like.

Figure 5:
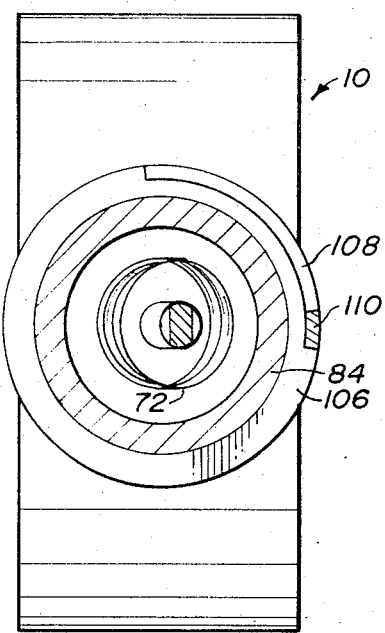
FIG. 5 is a view taken on line 5—5 of FIG. 2.

In order to provide positive stops for the movement of the disc, a stop member 110 extends downwardly from handle 100 (See FIGS. 2 and 5). A ring member 106 is connected to bonnet nut member 84 and has a groove 108. The groove 108 has a circumferential extent of approximately 90 degrees and receives the end of the stop member 110. As shown in FIG. 5, this limits the extent of movement of the valve disc to a first closed position (shown solid) and a second open position.

The invention has been described in great detail sufficient to enable one of ordinary skill in the valve art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A valve comprising:
    a body having a through flow passage of generally circular cross-section and a longitudinal axis;
    a valve disc member positioned in said passage and having an outer periphery adapted to close said passage when rotated to a position generally transverse to the axis;
    a rotatable operating stem connected to said valve disc and extending outwardly through said body;
    an actuating stem positively connected to said operating stem and having an outer end portion inclined relative to the axis of rotation of said operating stem;
    a bellows assembly enclosing said actuating stem and having a lower end portion joined to said body and an outer end portion inclined at an angle generally corresponding to the angle of said actuating stem and rotatably engaged therewith; and,
    means for applying a generally radially acting force to the outer end of said stem whereby rotation of said stem produces deflection of said bellows substantially without torsional loading of said bellows.

2. The valve as defined in claim 1 wherein said operating stem and said actuating stem are integrally formed.

3. The valve as defined in claim 1 wherein the outer end of said bellows assembly comprises a rigid cap member having an opening which receives the inclined end portion of said operating stem.

4. The valve as defined in claim 1 wherein said bellows assembly is enclosed by a rigid, cup-shaped housing rotatably joined to said body for rotation about the axis of said operating stem.

5. The valve as defined in claim 1 wherein said operating stem is supported from said valve disc and loosely guided in aligned openings in said body.

6. The valve as defined in claim 1 wherein said operating stem and said actuating stem are rotatably guided at least two points by bearing means.

7. The valve as defined in claim 3 wherein said means for applying a radial force to said stem includes a rigid, cup-shaped housing rotatably joined to said body for rotation about the axis of said operating stem, and wherein said cap member is rotatably received in said housing.

8. A valve as defined in claim 7 wherein said cap member and said cup-shaped housing are rotatably engaged through a bearing means.

9. A valve as defined in claim 1 wherein said bellows assembly includes a hollow, generally cylindrical bellows member having an open lower end positioned about said operating stem with said lower end sealingly clamped to said body.

10. A valve as defined in claim 9 including a clamp ring member having a flange which overlies a flange on the lower end of said bellows member.

* * * * *